United States Patent
Yang

(10) Patent No.: US 7,308,515 B2
(45) Date of Patent: Dec. 11, 2007

(54) DEVICES AND METHODS FOR SIGNAL SWITCHING AND PROCESSING

(75) Inventor: Shih-Yun Yang, Tao Yuan Shien (TW)

(73) Assignee: Quanta Computer Inc., Tao Yuan Shien (TW)

( * ) Notice: Subject to any disclaimer, the term of this patent is extended or adjusted under 35 U.S.C. 154(b) by 295 days.

(21) Appl. No.: 11/243,836

(22) Filed: Oct. 5, 2005

(65) Prior Publication Data

US 2007/0022234 A1    Jan. 25, 2007

(30) Foreign Application Priority Data

Jul. 20, 2005    (TW) .............................. 94124474 A

(51) Int. Cl.
*G06F 13/12* (2006.01)
*G06F 13/00* (2006.01)

(52) U.S. Cl. .................... 710/72; 710/62; 710/15; 710/305; 709/224

(58) Field of Classification Search ............ 710/15–19, 710/62–73, 305–316; 709/223–224
See application file for complete search history.

(56) References Cited

U.S. PATENT DOCUMENTS

| | | | |
|---|---|---|---|
| 5,197,977 A | | 3/1993 | Hoffman, Jr. et al. |
| 5,532,939 A | * | 7/1996 | Psinakis et al. ............ 709/226 |
| 5,609,629 A | | 3/1997 | Fearnot et al. |
| 5,618,298 A | | 4/1997 | Simon |
| 5,626,591 A | | 5/1997 | Kockerling et al. |
| 5,629,077 A | | 5/1997 | Turnlund et al. |
| 5,697,943 A | | 12/1997 | Sauer et al. |
| 5,766,710 A | | 6/1998 | Turnlund et al. |
| 6,068,636 A | | 5/2000 | Chen |
| 6,143,022 A | | 11/2000 | Shull et al. |
| 6,379,379 B1 | | 4/2002 | Wang |
| 6,391,052 B2 | | 5/2002 | Buirge et al. |
| 6,488,701 B1 | | 12/2002 | Nolting et al. |
| 6,503,259 B2 | | 1/2003 | Huxel et al. |
| 6,537,310 B1 | | 3/2003 | Palmaz et al. |
| 6,557,170 B1 | * | 4/2003 | Wilder et al. ............... 725/130 |
| 6,569,173 B1 | | 5/2003 | Blatter et al. |
| 6,602,287 B1 | | 8/2003 | Millare et al. |
| 6,623,510 B2 | | 9/2003 | Carley et al. |
| 6,652,575 B2 | | 11/2003 | Wang |
| 6,666,873 B1 | | 12/2003 | Cassell |
| 6,671,756 B1 | * | 12/2003 | Thomas et al. ............... 710/73 |
| 6,736,824 B2 | | 5/2004 | Borghi |
| 6,736,825 B2 | | 5/2004 | Blatter et al. |
| 6,901,455 B2 | * | 5/2005 | Gough .......................... 710/8 |

(Continued)

*Primary Examiner*—Christopher Shin
(74) *Attorney, Agent, or Firm*—Thomas, Kayden, Horstemeyer & Risley

(57) ABSTRACT

A device for signal switching and processing. A plurality of control signal output terminals are connected to a plurality of computers. A control signal input terminal receives control signals from an input device. A signal processor determines a control signal output terminal to output the control signals, thus, the User interface (UI) of a first computer connected thereto is controlled. A plurality of video input terminals connect to the computers. A video output terminal is connected to a display. An image processor receives UI screens of the computers from the video input terminals, integrates the UI screens into an integrated screen, and outputs the integrated screen to the display, thus, current UI screens of the computers reflecting the control signals are simultaneously displayed.

20 Claims, 4 Drawing Sheets

U.S. PATENT DOCUMENTS

| | | |
|---|---|---|
| 6,915,362 B2 * | 7/2005 | Ramsey et al. ............... 710/62 |
| 7,028,110 B2 * | 4/2006 | Seki et al. .................... 710/36 |
| 7,047,344 B2 * | 5/2006 | Lou et al. ................... 710/305 |
| 7,139,861 B2 * | 11/2006 | Lee ............................ 710/316 |
| 7,240,111 B2 * | 7/2007 | VanHarlingen et al. ..... 709/224 |
| 2001/0034550 A1 | 10/2001 | Buirge et al. |
| 2002/0055769 A1 | 5/2002 | Wang |
| 2002/0058955 A1 | 5/2002 | Blatter et al. |
| 2002/0082625 A1 | 6/2002 | Huxel et al. |
| 2002/0099434 A1 | 7/2002 | Busceml et al. |
| 2002/0111590 A1 | 8/2002 | Davila et al. |
| 2002/0133183 A1 | 9/2002 | Lentz et al. |
| 2002/0188318 A1 | 12/2002 | Carley et al. |
| 2002/0193864 A1 | 12/2002 | Khosrevi et al. |
| 2003/0028246 A1 | 2/2003 | Palmaz et al. |
| 2003/0060877 A1 | 3/2003 | Falotico et al. |
| 2003/0065346 A1 | 4/2003 | Evens et al. |
| 2003/0069629 A1 | 4/2003 | Jadhav et al. |
| 2003/0083814 A1 | 5/2003 | Eisert |
| 2003/0114919 A1 | 6/2003 | McQuiston et al. |
| 2003/0125799 A1 | 7/2003 | Limon |
| 2003/0183671 A1 | 10/2003 | Mooradian et al. |
| 2003/0216605 A1 | 11/2003 | Edwin et al. |
| 2003/0225447 A1 | 12/2003 | Majercak et al. |
| 2004/0009289 A1 | 1/2004 | Cartey et al. |

* cited by examiner

DEVICES AND METHODS FOR SIGNAL SWITCHING AND PROCESSING

BACKGROUND

The invention relates to computer techniques, and in particular, to devices and methods for signal switching and processing.

Conventionally, a computer is arranged one display, a mouse and single keyboard. A KVM (Keyboard, Video monitor and Mouse) switch enables a plurality of computers to share one display, a mouse and single keyboard, and in turn displays a screen of a computer by signal switching. The graphical user interface (GUI) of only one of the computers is displayed after each switch. The states of other connected computers, however, change continuously, and only changes on the current computer can be seen.

SUMMARY

Accordingly, devices and methods for signal switching and processing are provided.

An exemplary embodiment of device for signal switching and processing comprises a plurality of control signal output terminals, a control signal input terminal, a signal processor, a plurality of video input terminals, a video output terminal, and an image processor. The control signal output terminals are respectively connected to a plurality of computers. The control signal input terminal receives control signals from an input device. The signal processor connected between the input device and the control signal output terminals determines a control signal output terminal to output the control signals thereto, thus, the user interface (UI) of a first computer of the computers connected to the control signal output terminal is controlled. The video input terminals are connected to the computers. The video output terminal is connected to a display. The image processor connected between the signal processor and the video output terminal receives UI screens of the computers from the video input terminals, integrates the UI screens into an integrated screen, and outputs the integrated screen to the display, thus current UI screens of the computers reflecting the control signals are simultaneously displayed.

An exemplary embodiment of device for signal switching and processing comprises a plurality of control signal output terminals, a control signal input terminal, a signal processor, a plurality of video input terminals, a video output terminal, and an image processor. The control signal output terminals are respectively connected to control signal input interfaces of a plurality of computers. The control signal input terminal connected to an input device receives control signals therefrom. A first control signal from the input device directs movement of a User interface (UI) element of a first computer of the computers. The signal processor connected to the control signal input terminal determines a control signal output terminal corresponding to the location of the UI element for output of control signals thereto, thus controlling the UI of a different computer (referred to as a second computer) of the computers connected to the control signal output terminal. The video input terminals are connected to video output interfaces of the computers. The video output terminal is connected to a display initially showing a UI screen of the first computer. The image processor connected to the video output terminal receives a UI screen of the second computer from one of the video input terminals, and outputs the UI screen to the display.

An exemplary embodiment of a method for signal switching and processing is implemented in a device. The device comprises a plurality of control signal output terminals, a control signal input terminal, a plurality of video input terminals, and a video output terminal. The control signal output terminals are respectively connected to a plurality of computers. The control signal input terminal receives control signals from an input device, and a control signal output terminal to output the control signals is then determined. Thus, the user interface (UI) of a first computer of the computers connected to the control signal output terminal is accordingly controlled. The video input terminals are connected to the computers. The video output terminal is connected to a display. UI screens of the computers are received from the video input terminals and integrated a single screen. The integrated screen is output to the display, thus, current UI screens of the computers reflecting the control signals are simultaneously displayed.

DESCRIPTION OF THE DRAWINGS

The invention can be more fully understood by reading the subsequent detailed description and examples with references made to the accompanying drawings, wherein.

DETAILED DESCRIPTION

Devices and methods for signal switching and processing are provided.

Figure 1:
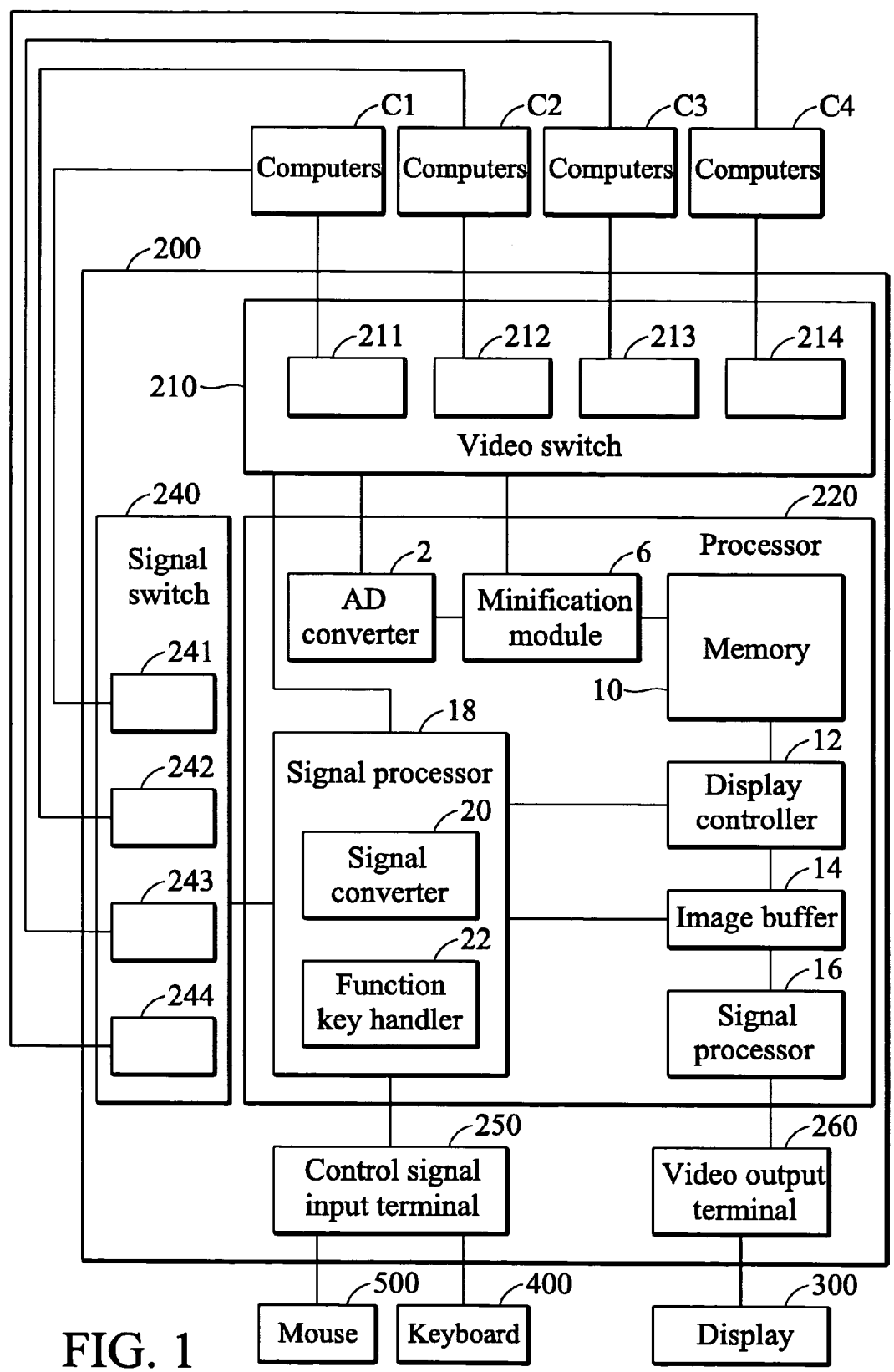
FIG. 1 is a block diagram of computers and an exemplary embodiment of a device for signal switching and processing.

In FIG. 1, device 200 for signal switching and processing comprises video switch 210, processor 220, signal switch 240, control signal input terminal 250, and video output terminal 260. A plurality of control signal output terminals 241-244 respectively connect to control signal input interfaces of a plurality of computers C1-C4. Signal switch 240 routes input signals to one of the control signal output terminals 241-244. Control signal input terminal 250 connects input devices (such as keyboard 400 and mouse 500) and receives input control signals therefrom. Signal processor 18 determines a control signal output terminal for output of control signals from the input devices (such as keyboard 400 and mouse 500), thus, the user interface (UI) of a first computer Cl connected to the control signal output terminal is controlled.

Processor 220 may be implemented in a single chip.

Video input terminals 211-214 respectively connect to video output interfaces of computers C1-C4. Video output terminal 260 connects to display 300. Video switch 210 can switch each of the video input terminals 211-214. Video input terminals 211-214 and video output terminal 260 may conform to RGB cabling standards or digital video interface (DVI) standards. Control signal input terminal 250 and control signal output terminals 241-244 may conform to the personal system/2 (PS/2) specification.

Figure 2:
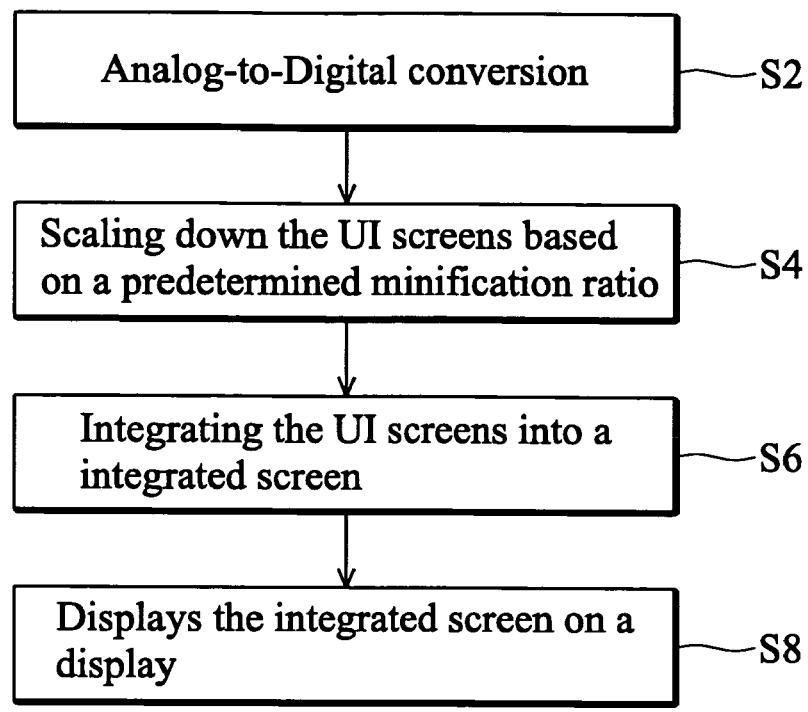
FIG. 2 is flowchart of integrating video from computers.

Video signals from computers C1-C4 may comprise analog or digital visual signals of computer UI screens. With reference to FIG. 2, analog-to-digital (AD) converter 2 converts received analog video signals to digital video signals (step S2). Minification module 6 scales down the digital video signals based on a predetermined minification ratio (step S4) and temporarily stores the scaled-down video signals in memory 10. Image processor 12 retrieves the scaled-down video signals of respective computers from memory 10, integrates the video signals into an integrated screen (step S6), and displays the integrated screen on display 300 through display controller 14, image buffer 16, and video output terminal 260, thus, the UIs of computers C1-C4 are simultaneously displayed (step S8).

Figure 3:
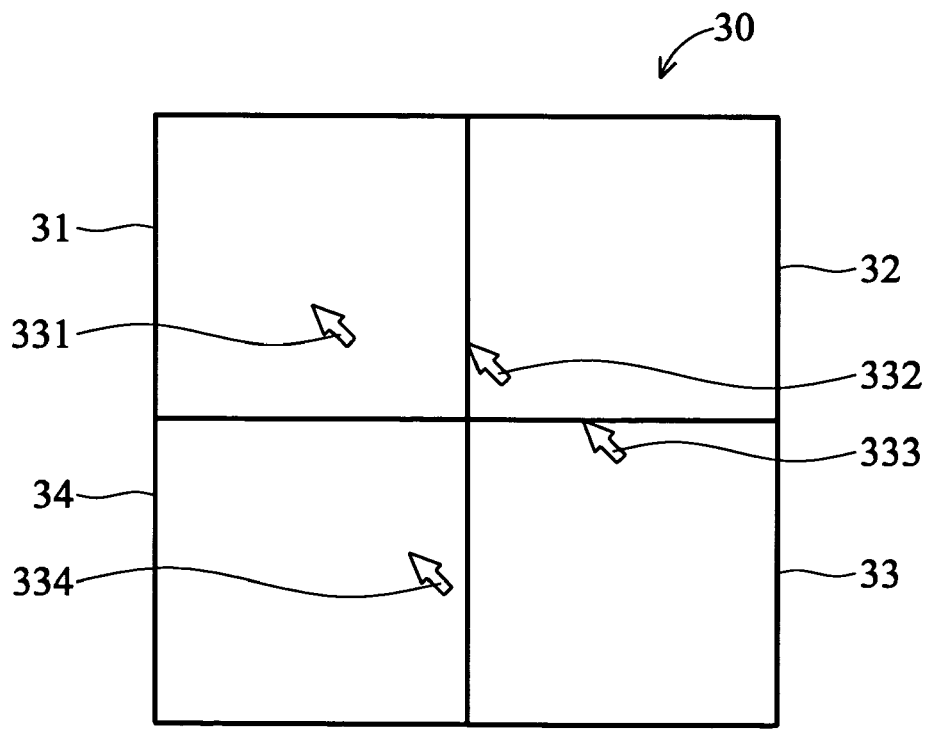
FIG. 3 is a schematic diagram of an exemplary embodiment of an integrated screen.

FIG. 3 shows an exemplary embodiment of integrated screen 30. UI screens of computers C1-C4 are respectively displayed on areas 31-34. Video signals corresponding to areas 31-34 may respectively have different resolutions, and are integrated by image processor 12 to conform to the resolution of integrated screen 30 on display 300. Image processor 12 (or other components of processor 220) may provide information concerning the boundaries of areas 31-34 and resolutions of a selected computer. Although display 300 simultaneously displays the screens of four computers, only one of the computers selected by signal processor 18 can immediately receive and respond to control signals from the input device.

Figure 4:
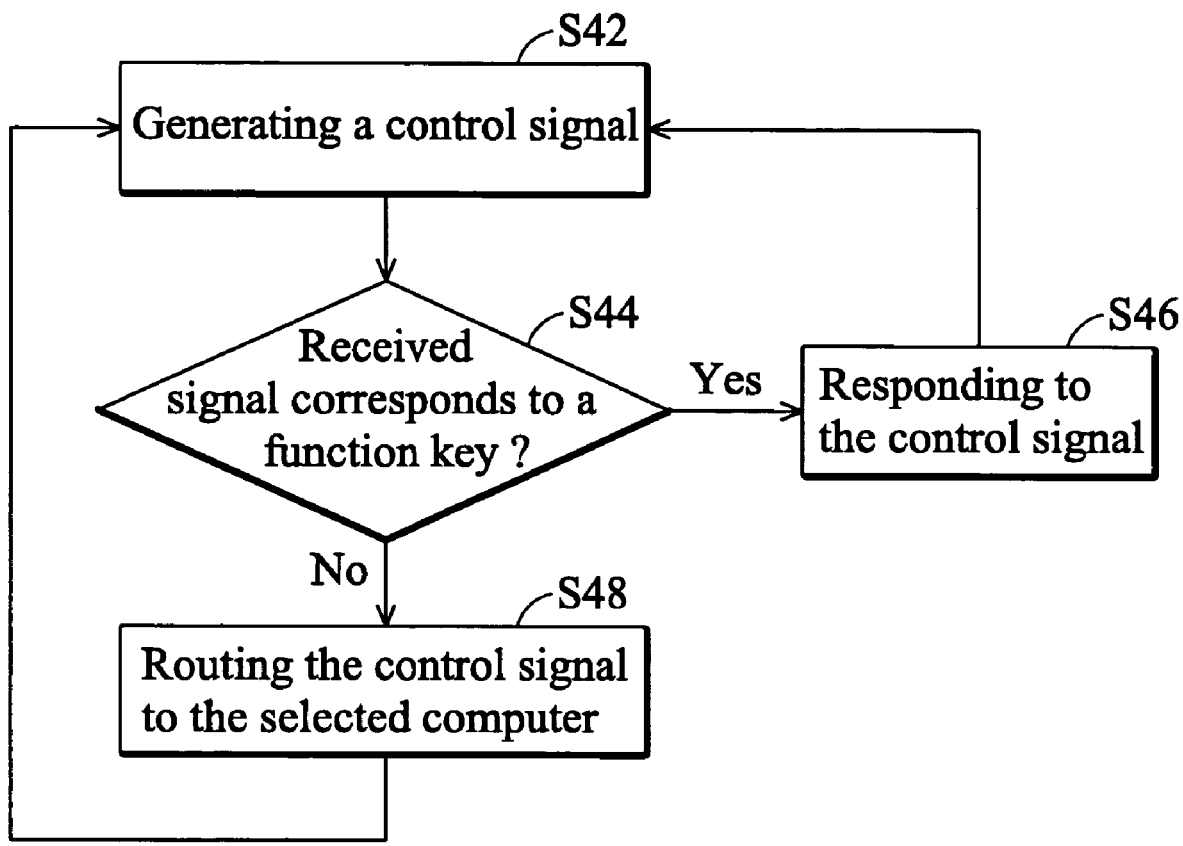
FIG. 4 is a flowchart of responding to function keys.

Image processor 12 may alter the integrated screen layout according to control signals from the input devices (such as keyboard 400 and mouse 500). For example, device 200 can identify function keys of keyboard 400. With reference to FIG. 4, keyboard 400 is operated to generate a control signal (step S42). When receiving the control signal through control signal input terminal 250, signal processor 18 determines whether the received signal corresponds to a function key of device 200 (step S44). If so, function key handler 22 responds to the control signal (step S46). If not, signal processor 18 routes the control signal to the selected computer (step S48). In step S46, function key handler 22 may notify image processor 12 to adjust the integrated screen layout, including adding or deleting an area thereon, and modifying area boundaries, size, and locations.

Signal processor 18 selects a control signal output terminal, thus selecting a computer connected thereto. Signal processor 18 may select a computer based on control signals from the input devices. Function keys, a frame movable among areas 31-34, or other ways may be utilized to select a corresponding computer, an exemplary embodiment of which is described in the following.

Control signals from mouse 500 move a UI element of a selected computer on the integrated screen. For example, computer C1 in FIG. 1 is the selected computer, and cursor 331 in FIG. 3 is a movable GUI element of computer C1. Signal processor 18 determines a control signal output terminal corresponding to the location of cursor 331, thus, a corresponding computer is selected. Signal processor 18 outputs control signals from input devices (such as keyboard 400 and mouse 500) to the corresponding control signal output terminal, thus, the corresponding computer is controlled.

Control signals from the input devices comprise signals generated by mouse 500. Signal converter 20 can convert the signals generated by mouse 500 according to a ratio of the resolution of integrated screen 30 to the resolution of the selected computer.

Figure 5:
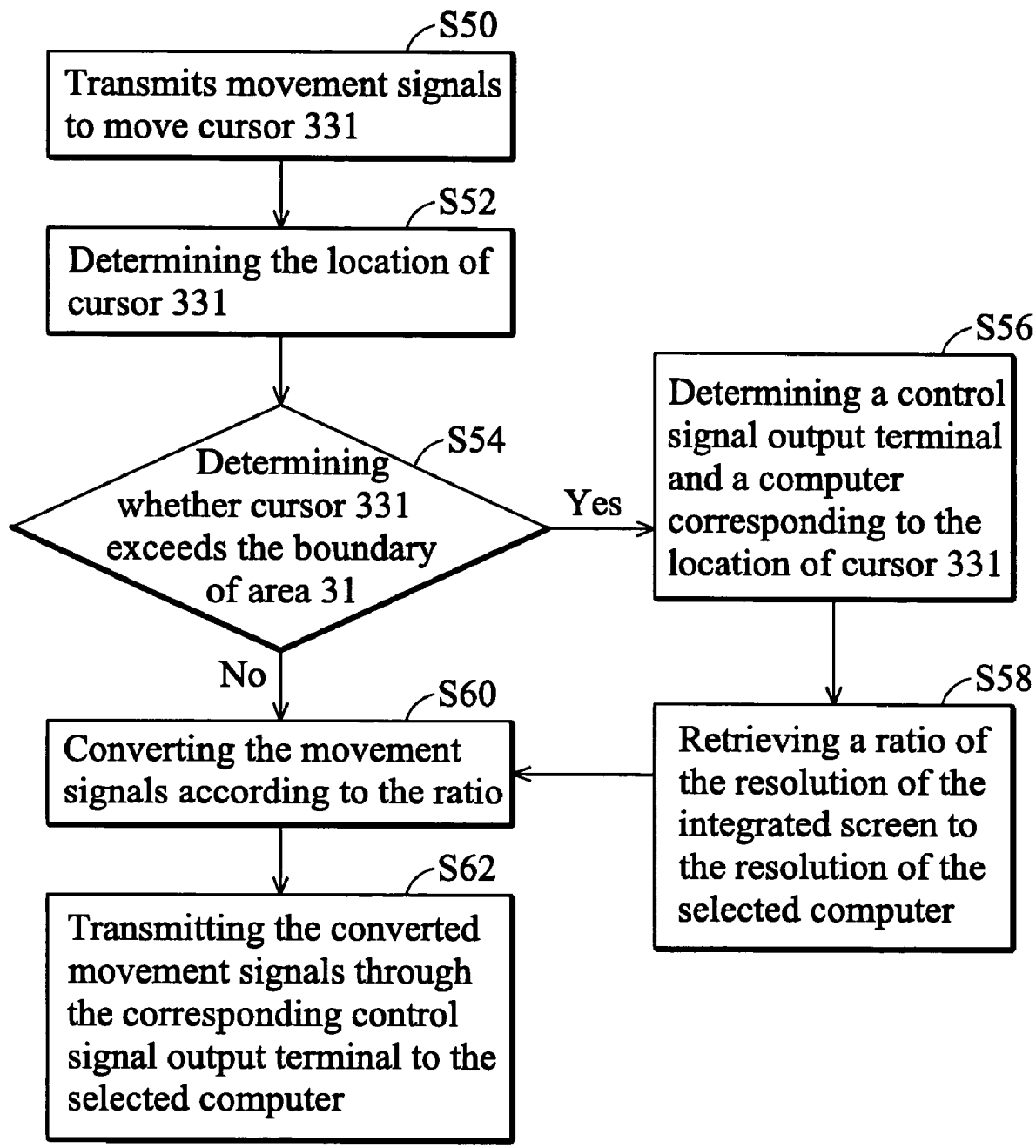
FIG. 5 is a flowchart of selecting a computer.

With reference to FIG. 5, mouse 500 transmits movement signals to signal processor 18 to move cursor 331 (step S50). Signal processor 18 determines the location of cursor 331 (step S52) and determines whether cursor 331 exceeds the boundary of area 31 (step S54). If not, signal processor 18 converts the movement signals according to a ratio of the resolution of integrated screen 30 to the resolution of the selected computer (such as the current computer C1) (step S60). Signal processor 18 transmits the converted movement signals through a control signal output terminal (such as the current control signal output terminal 241) corresponding to the location of cursor 331 to the selected computer (such as the current computer C1) (step S62).

If cursor 331 exceeds the boundary of area 31, signal processor 18 determines a control signal output terminal corresponding to the location of cursor 331, thus a computer corresponding thereto is determined (step S56). For example, when cursor 331 is on the right boundary of area 31, signal processor 18 determines that control signal output terminal 242 and computer C2 correspond to area 32. When cursor 331 is on the lower boundary of area 31, signal processor 18 determines that control signal output terminal 244 and computer C4 correspond to area 34.

Next, signal processor 18 retrieves a ratio of the resolution of the integrated screen and the resolution of the selected computer (such as computer C4) (step S58). Signal processor 18 converts the movement signals according to the ratio of the resolution of the integrated screen and the resolution of the selected computer (such as computer C4) (step S60). Signal processor 18 transmits the converted movement signals through a control signal output terminal (such as control signal output terminal 244) corresponding to the location of cursor 331 to the selected computer (such as computer C4) (step S62), thus controlling a GUI element (such as cursor 334) of the selected computer.

When cursor exceeds the boundary of area 31, and the movement signals are transmitted to another selected computer (such as computer C2), signal processor 18 may reset the location of the cursor (such as cursor 332) of another computer based on the location of cursor 331 and transmit subsequent movement signals to the latter selected computer. For example, when the location of cursor 331 is at 95% height on the right boundary of area 31, signal processor 18 transmits a control signal resetting cursor 332 of computer C2 to 95% height on the left boundary of area 32. As soon as the selected computer is switched to computer C2, control signals transferred by signal processor 18 can control cursor 332.

UI changes or computer execution states in response to control signals are subsequently transmitted to device 200. Integrated screen 30 on display 300 reflects the control signals, including cursor movement.

When signal switch 240 switches control signals to another control signal output terminal, signal processor 18 may transmit a corresponding signal to image switch 210 to display the UI screen of a computer connected to the control signal output terminal on display 300. When the integrated screen only comprises the UI screen of one computer, device 200 can select and display a UI screen of another computer on display 300 to according to cursor location.

Thus, the device for signal switching and processing integrates and outputs UI screens of a plurality of computers to signal display. The UI screens on the display can be selected and operated. The device selects one of the control signal output terminals according to control signals of an input device and subsequently outputs control signals to a selected computer.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A device for signal switching and processing, comprising:
    a plurality of control signal output terminals respectively connected to a plurality of computers;
    a control signal input terminal connected to an input device, and receiving control signals therefrom;
    a signal processor connected between the input device and the control signal output terminals, determining a control signal output terminal to output the control signals thereto, thus controlling the User interface (UI) of a first computer of the computers connected to the control signal output terminal;
    a plurality of video input terminals connected to the computers;
    a video output terminal connected to a display; and
    an image processor connected between the signal processor and the video output terminal, receiving UI screens of the computers from the video input terminals, integrating the UI screens into an integrated screen, and outputting the integrated screen to the display, thus, current UI screens of the computers reflecting the control signals are simultaneously displayed.

2. The device as claimed in claim 1, wherein a first control signal from the input device directs movement of a UI element of the first computer on the integrated screen, the signal processor determines a corresponding control signal output terminal based on the location of the UI element and transmits subsequent control signals from the input device to the corresponding control signal output terminal.

3. The device as claimed in claim 2, wherein the UI element comprises a cursor.

4. The device as claimed in claim 3, wherein the first control signal from the input device directs movement of the cursor, further comprising:
    a converter converts the first control signal according to a ratio of the resolution of the integrated screen to the resolution of the first computer.

5. The device as claimed in claim 4, wherein when the corresponding control signal output terminal connected to another computer, referred to as a second computer, and the signal processor retrieves a ratio of the resolution of the integrated screen to the resolution of the second computer and accordingly converts subsequent control signals from the input device.

6. The device as claimed in claim 5, wherein the video output terminal and the video input terminals conform to RGB or Digital Visual Interface (DVI) cabling standards.

7. The device as claimed in claim 6, wherein the control signal input terminal and the control signal output terminals conform to the personal system/2 (PS/2) specification.

8. The device as claimed in claim 5, wherein the image processor alters layout of the integrated screen according to a second control signal from the input device.

9. The device as claimed in claim 5, wherein the signal processor resets a cursor of the second computer according to the location of the cursor of the first computer.

10. A device for signal switching and processing, comprising:
    a plurality of control signal output terminals respectively connected to control signal input interfaces of a plurality of computers;
    a control signal input terminal connected to an input device, and receiving control signals therefrom, wherein a first control signal from the input device directs movement of a User interface (UI) element of a first computer of the computers;
    a signal processor connected to the control signal input terminal, determining a control signal output terminal corresponding the location of the UI element to output the control signals thereto, thus, UI of a different computer (referred to as a second computer) of the computers connected to the control signal output terminal is controlled;
    a plurality of video input terminals connected to video output interfaces of the computers;
    a video output terminal connected to a display initially showing a UI screen of the first computer; and
    an image processor connected to the video output terminal, receiving a UI screen of the second computer from one of the video input terminals, and outputting the UI screen to the display.

11. The device as claimed in claim 10, wherein the UI element comprises a cursor.

12. The device as claimed in claim 11, wherein the video output terminal and the video input terminals conform to RGB or Digital Visual Interface (DVI) cabling standards.

13. The device as claimed in claim 12, wherein the control signal input terminal and the control signal output terminals conform to the personal system/2 (PS/2) specification.

14. The device as claimed in claim 11, wherein the image processor alters screen layout on the display according to a second control signal from the input device.

15. The device as claimed in claim 11, wherein the signal processor resets a cursor of the second computer according to the location of the cursor of the first computer.

16. A method for signal switching and processing, comprising:
    respectively connecting a plurality of control signal output terminals to a plurality of computers;
    connecting an input device to a control signal input terminal receiving control signals therefrom;
    determining a control signal output terminal to output the control signals thereto, thus controlling the user interface (UI) of a first computer of the computers connected to the control signal output terminal;
    connecting a plurality of video input terminals to the computers;

connecting a video output terminal to a display;
receiving UI screens of the computers from the video input terminals;
integrating the UI screens into an integrated screen; and
outputting the integrated screen to the display, thus enabling the display to simultaneously display current UI screens of the computers and reflect the control signals.

17. The method as claimed in claim 16, wherein a first control signal from the input device directs movement of a cursor of the first computer on the integrated screen, further comprising:
   determining a corresponding control signal output terminal based on the location of the cursor; and
   transmitting subsequent control signals from the input device to the corresponding control signal output terminal.

18. The method as claimed in claim 17, further comprising converting the first control signal according to a ratio of the resolution of the integrated screen to the resolution of the first computer.

19. The method as claimed in claim 18, wherein, when the corresponding control signal output terminal is connected to another computer, referred to as a second computer, further comprising:
   retrieving a ratio of the resolution of the integrated screen to the resolution of the second computer; and
   accordingly converting subsequent control signals from the input device.

20. The method as claimed in claim 19, further comprising resetting a cursor of the second computer according to the location of the cursor of the first computer.

* * * * *